3,264,013
COUPLING FOR PIPE SECTIONS
Henry M. Richardson, Somers, and Wesley S. Larson, Hazardville, Conn., and Alfred C. Alberghini, Springfield, Mass., assignors, by mesne assignments, to The Youngstown Sheet and Tube Company, Youngstown, Ohio, a corporation of Ohio
Filed Sept. 30, 1963, Ser. No. 312,454
4 Claims. (Cl. 285—22)

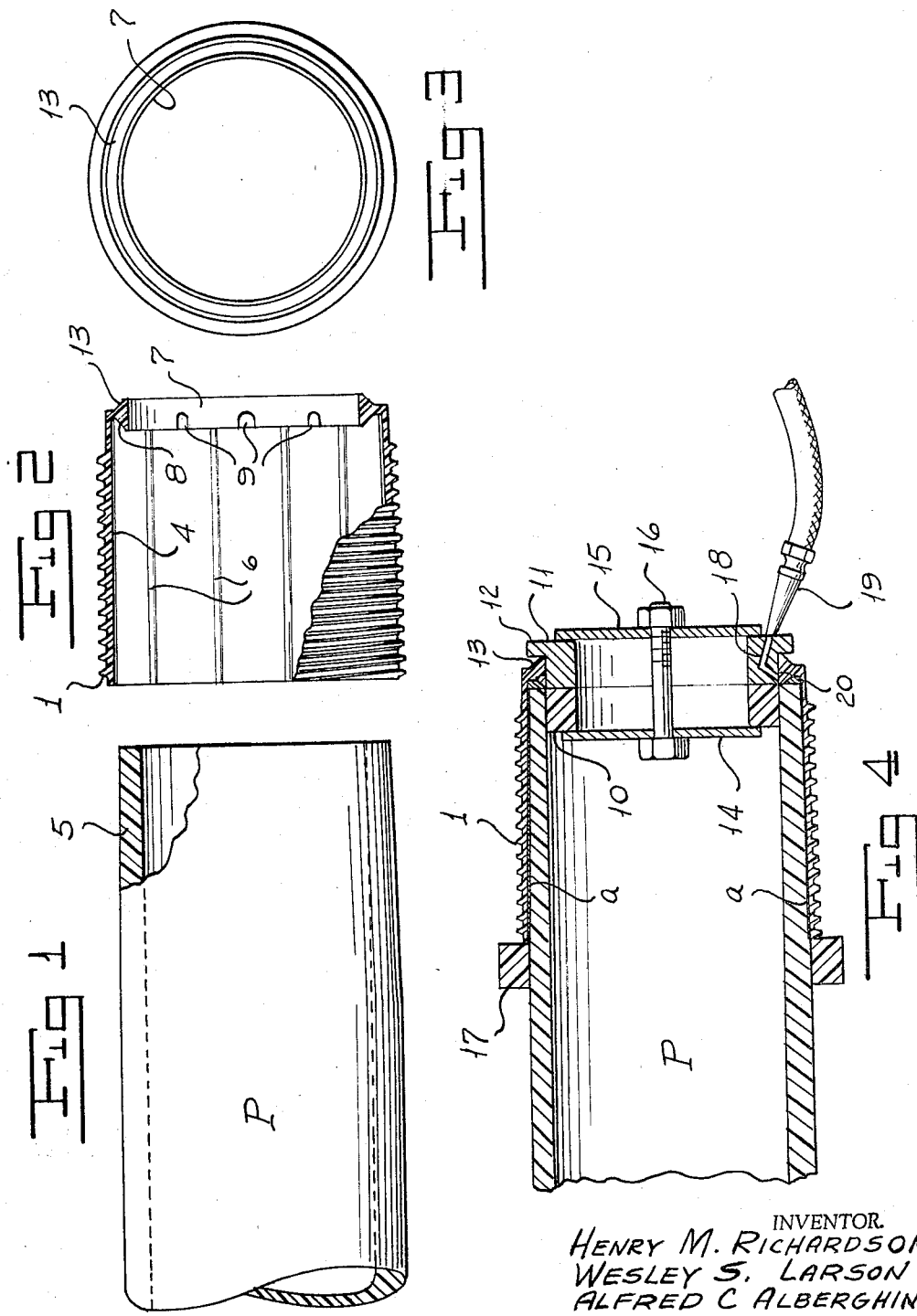

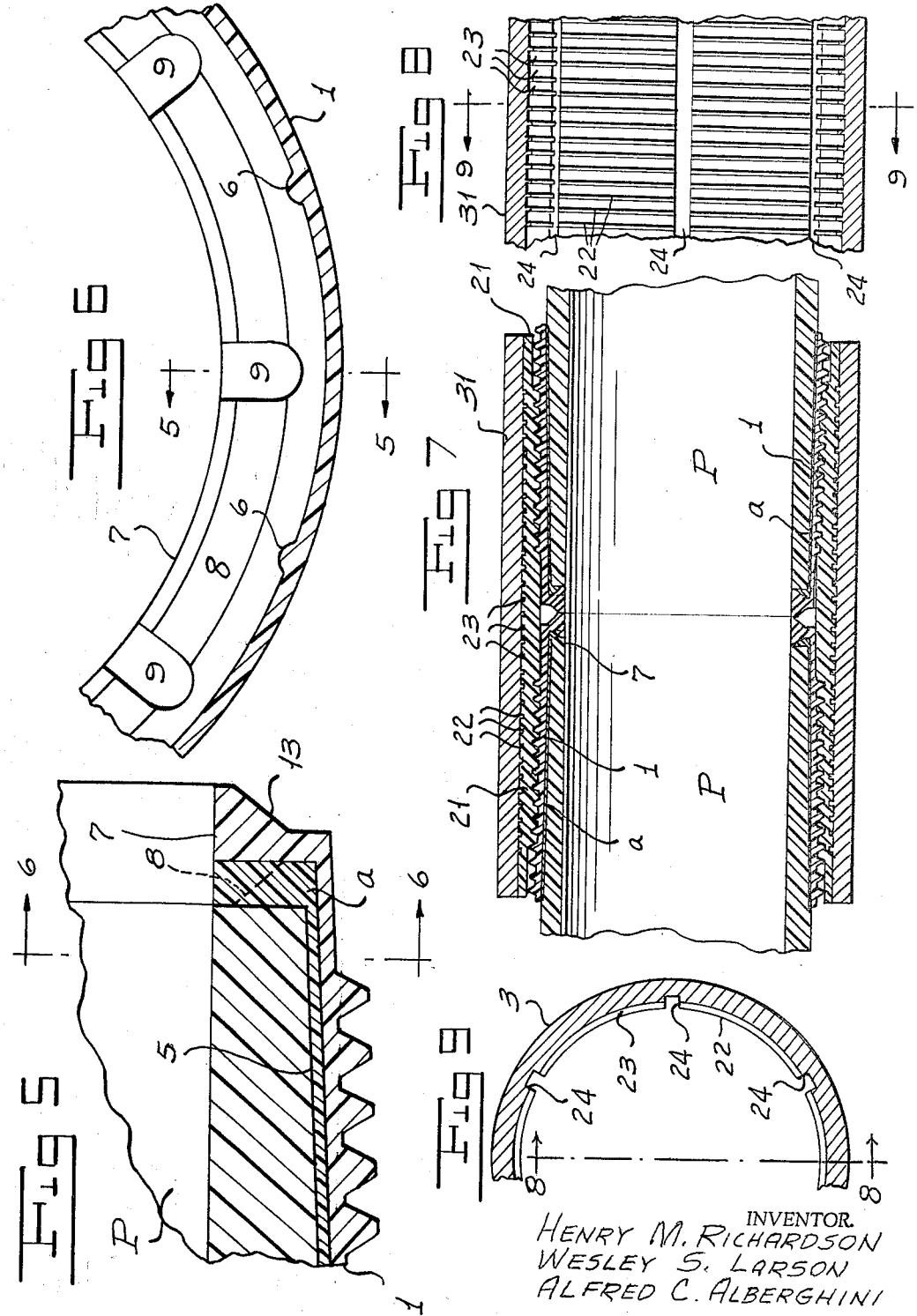

This invention is a pipe coupling, useful in coupling together successive sections of fiber-reinforced pipe, such, for example, as disclosed in Chase Donaldson U.S. Patent No. 2,803,576 issued April 20, 1957.

Pipe of this character is produced by helically wrapping fiber-reinforced plastic tape about a mandrel and thereafter curing the resulting structure to form a fluid impervious pipe having a relatively high hoop and axial strength.

Such pipe is manufactured in sections which are joined together, in the field, to build up a liquid or gas conveying system of the desired length.

The invention has numerous objects including the following:

(a) The production of a pipe coupling which will restrain, by the use of a combination of materials, the very high stress concentrations that are inherent in high pressure fiber-reinforced pipe systems.

(b) A threaded coupling made of relatively inexpensive materials and the process of forming the male and female parts thereof in such manner as to reduce the shear and slip planes of the material to a satisfactory minimum.

(c) The achievement of a threaded joint coupling which is fluid tight sealing and yet rapidly demountable, by precise control of thread profiles, tolerances and configuration of its parts.

(d) The assurance of corrosive resistance of a coupling which includes metal, by a continuity of noncorrosive materials in the fluid contacting parts of the coupling.

(e) The production of a coupling embodying sleeves adhesively secured to the ends of the pipe sections and the attainment of maximum strength and permanence of the joint between said sleeves and the pipe sections, through positive control of adhesive thickness and the elimination of voids in such adhesive.

(f) The production of a coupling of reasonable cost comparable with its strength, manner of assembly and its simplicity of use in the field.

Speaking generally, the coupling of this invention comprises internally tapered fiber-reinforced plastic shells of novel construction fitted over and adhesively secured in a unique manner to the contiguous, correspondingly tapered ends of adjacent pipe sections. The exterior of each shell is also tapered and threaded to receive correspondingly tapered and threaded opposite end portions of a novel tubular coupling member. This coupling member comprises an internally threaded fiber-reinforced plastic sleeve positioned within a closely conforming tubular metal shell. This shell serves to effectually contain the plastic coupling sleeve which it embraces, against outward radial yielding when subjected to high internal pressures and at the same time secures together the companion shells on the two pipe sections against separation in a direction axially of the pipe system.

These several elements of the coupling cooperate with one another to firmly secure adjacent pipe sections together to form a hermetic seal while maintaining at the joint the same internal diameter as the I.D. of the pipe sections.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

FIG. 1 shows one end of one pipe section tapered according to the present invention.

FIG. 2 is a cross section of a tapered pipe shell adapted to be passed over and adhesively secured to the tapered portion of the pipe.

FIG. 3 is an end elevation of FIG. 2.

FIG. 4 is a central longitudinal section of one of the pipe sections with a shell in position and both of which have temporarily associated therewith jigs for assisting in the adhesive securing the pipe shell to the pipe section.

FIG. 5 is a fragmental view showing in central section, the adhesive attachment of a pipe shell to a pipe section, this having been accomplished according to the method illustrated in FIG. 4.

FIG. 6 is a fragmental section on the line 6—6 of FIG. 5.

FIG. 7 is a diametric section of the adjacent contiguous ends of two pipe sections assembled with respect to one another by a composite coupling member of plastic material embraced by a metal shell. This figure illustrates the coupling and pipe sections in coupled relation.

FIG. 8 is a central diametric section, on the line 8—8 of FIG. 9, of one end portion of the metal shell shown in FIG. 7, but shown as it appears before the plastic sleeve has been positioned therein.

FIG. 9 is a broken-away section on the line 9—9 of FIG. 8.

The coupling of this invention embodies two companion pipe shells 1 adapted to be adhesively individually secured to two adjacent pipe ends and thereafter coupled together by a coupling member comprising a plastic coupling sleeve 21, embraced by a reinforcing metal sleeve 31. These separate parts and the manner of their assembly with respect to the pipe sections and to each other will now be described in detail.

Each pipe shell 1 is, in practice, injection molded from a 40 percent glass filled nylon plastic material in which the glass is of discrete random distributed fiberglass. Said shell is longitudinally interiorly tapered as shown at 4 for cooperation with a correspondingly tapered portion 5 at the end of the pipe section P and is provided on its interior with a plurality of longitudinally extending ribs 6 which engage directly with the taper of the pipe. These ribs are relatively small so that, while the ribs firmly engage the tapered portion of the pipe, the intervening portions of the shell between the ribs are spaced a few thousandths of an inch from the tapered surface of the pipe to thereby provide shallow cavities for the flow and reception of a binding adhesive into the space between the shell and said tapered surface 5 of the pipe.

Each shell 1 is also provided at its smaller end with an internal annular ring 7, having oppositely projecting annular flanges 8 and 13. As the shell is telescoped over the pipe, the inner flange 8 abuts the end edge of the pipe. Said flange 8 is, however, provided with cut away portions 9 shown best in FIGS. 2 and 6 which are utilized as next described in connection with FIG. 4.

This figure shows the manner of adhesively securing each pipe sleeve 1 to one of the pipe sections P through the employent of certain jigs illustrated in this figure. One of these jigs comprises two annular rings 10 and 11, preferably of Teflon. The ring 10 is of a size to snugly fit the interior of the pipe, while the ring 11 snugly fits into the interior of the ring 7 and has an outward radial flange 12 to bear against the outer flange 13 of said ring. Metal plates 14 and 15 are brought to bear against the distant faces of said rings 10 and 11 and they are clamped firmly together by a bolt 16 which causes sufficient radial expansion of the rings to hold them firmly in place at the pipe end. The second jig is in the form of a split ring 17 which is clamped about the exterior of the pipe P in abutting relation to the contiguous end of the pipe sleeve 1 to form a dam which will preclude adhesive introduced into the distant end of the sleeve from squeezing out adjacent the dam. The ring 11 is provided therein with a passage 18 which leads into one of the cut outs 9 of the flange 8.

When the jigs are in the positions shown in FIG. 4 an appropriate adhesive is forced through the passage 18 from a supply nozzle 19, so that it enters and fills the substantially triangular space 20 formed between the flange 8 and the end surface of the pipe P. As this space becomes filled with the adhesive, it acts as a manifold to feed the adhesive longitudinally of the shell into the cavities between the ribs 6 until the entire space between the shell 1 and the tapered surface of the pipe P is filled with adhesive.

After the adhesive is thus introduced the nozzle 19 is withdrawn, and, before the jigs are removed, the adhesive is permitted to set, or may be cured, depending upon the type of adhesive employed. In any event, the pipe sleeve is thereby firmly and permanently adhered to the pipe.

The use of the ribs 6 on the interior of the pipe shell has many advantages. E.g., for a 2" I.D. pipe, semi circular ribs of approximately .004" high are found to be entirely satisfactory. They insure a uniform spacing of the shell from the tapered pipe end and provide channels for filling the voids between them and facilitate the expulsion of air from such voids so that the adhesive may function with maximum efficiency in securing the pipe shell in place.

Furthermore, if the shell should happen to be slightly "out of round" which sometimes occurs during the relief of stress in storage, these ribs will restore true roundness of the shell as it is forced onto the pipe, which latter is so rigid as to insure this result.

It is further observed that the shell 1 is externally threaded preferably with a 60° stub thread thereon having 1 in 32 taper when employed for a 2" I.D. pipe. This pipe and size of thread has been found highly efficient in the production of leakproof joints which can be "made up" and re-made with ordinary oil field pipe lubricant.

Contiguous pipe ends to be coupled together are all equipped with pipe shells 1 in the manner described and are shipped in this condition to the field, along with cooperating coupling sleeves of the character next described.

My research and tests have demonstrated that the joining of successive lengths of fiber-reinforced plastic pipe involves certain basic problems. At the end of such a pipe there is a stress concentration which, unless restrained by the coupling, will rupture the pipe at this point. The cause of this stress concentration at the pipe end is due primarily to the inherent structure of the pipe, wherein successive strips of reinforced tapes are helically wound in alternate opposite directions to form the pipe wall, so that at the very end of the pipe itself there is no restraining member except the inherent plastic of the pipe wall structure to hold said wall to size. Consequently the weakness at this point must be made up or at least compensated for by the coupling which must withstand not only these concentrations of hoop stress, but also the normal axial stresses in pipe line. Failure to fully understand these factors has led to much difficulty in the past with couplings for pipe of the character described.

With these facts in mind, the present invention is such as to give maximum strength, modulus and economy through the use of a coupling sleeve of corrosion resistant plastic material which will form an impervious seal with the shells of adjacent pipes and to which sleeve the necessary hoop and axial strength is imparted by enveloping said sleeve in a metal shell.

In accordance with the present invention, the coupling member embodies a metal reinforcing shell 31, shown best in FIGS. 7, 8 and 9. This shell is of tubular cylindrical form and is preferably of steel. It is provided on its interior with circumference ribs 22 which may conveniently be helical, to form between successive convolutions of the thread, grooves 23 of corresponding shape. These grooves extend for the greater portion of the length of the shell. In addition to the internal circumferential grooves 23, the shell is also provided with longitudinal grooves 24 which extend for the full length of the shell and are spaced apart circumferentially thereof. Six grooves 24 are utilized in the construction shown, although they may be more or less in number.

Within the metal shell 31, there is injection molded a high-glass-filled nylon plastic liner sleeve 21 in which fiberglass is randomly distributed. During the injection molding operation, there is molded in the inner surface of the opposite end portions of the coupling sleeve threads complementary to and tapered correspondingly to the threaded tapered portion of the pipe shells 1. In the resulting structure the nylon plastic sleeve 21 is thoroughly bonded to and interlocked with the steel sleeve 31 which embraces it due to the entry of such plastic into the channels 23 and grooves 24 of said shell so that there is absolutely no possibility of any part of this sleeve 21 shifting within the reinforcing shell 31.

In coupling together successive pipe sections in the field, one end of the reinforced coupling member is screwed onto the pipe shell of one pipe section and the next pipe section is then screwed into the other end of said coupling member until the flanges 13 of the contiguous pipe sleeves engage one another as shown in FIG. 7 to form between the pipe sections the desired fluid-tight joint. In this manner the sections may be successively joined to provide a pipe system of any desired length which will be as strong or stronger at the joints than the body of the pipe itself. There is no chance of stripping threads for the threads employed are made in accordance with ASTM standards approved for use in the current fiber-reinforced pipe industry. There will be no bursting of the couplings at the joints and the interior diameter of the pipe system will be uniform.

In the accompanying drawings the invention is shown as a coupling between successive pipe sections and this constitutes its major use. However, at the ends or terminals of any pipe line system a fixture is ordinarily employed for coupling the pipe line to cooperating apparatus. The invention as described may be employed for this purpose by utilizing as a terminal pipe section a relatively short pipe section or nipple which may form a part of a fitting which may be required for the purpose stated without departing from this invention.

The foregoing detailed description sets forth the invention in its preferred practical forms but the invention is to be understood as fully commensurate with the appended claims.

Having thus fully described the invention, what we claim as new and desire to secure by Letters Patent is:

1. An article of manufacture comprising,
    a plastic pipe,
    an external taper on at least one end of said pipe,
    a tubular pipe shell fitting over said tapered pipe end,
    threads on the exterior of said shell,
    alternate ribs and grooves on the interior of said pipe shell extending longitudinally of the pipe,
    said ribs in engagement with said pipe to center the pipe and define passageways between the pipe and shell,
    an internal ring at the small end of said pipe shell in abutment with said pipe,
    an annular groove in said ring communicating with said passageways, at least one opening between said groove and the exterior surface of said ring, and an adhesive in said passageways and grooves securing said shell to said pipe.

2. An article of manufacture comprising, a plastic pipe, an external taper on at least one end of said pipe, a tubular pipe shell fitting over said tapered pipe end, threads on the exterior of said shell, alternative ribs and grooves on the interior of said pipe shell extending substantially from one terminal end to the other of the shell and providing passageways, said ribs in engagement with said pipe to center the pipe and define passageways between the pipe and shell, an internal ring at the small end of said pipe shell in abutment with said pipe, an annular groove in said ring communicating with said passageways and adapted to receive and distribute adhesive to said passageways, and an adhesive in said passageways securing said shell to said pipe.

3. A pipe coupling comprising, a pipe shell of fiber-reinforced plastic material longitudinally internally tapered to fit over and be adhesively secured to a correspondingly tapered pipe end, the exterior of said pipe shell being tapered and threaded, a plurality of longitudinally extending ribs on the interior of said shell adapted to directly engage with the tapered pipe end to provide between said ribs spaces to receive the adhesive by which the pipe shell may be permanently secured to the pipe end, a coupling sleeve of fiber-reinforced plastic material internally tapered and threaded to screw onto the pipe shell, and a metal coupling shell embracing the plastic coupling sleeve to reinforce the same against outward radial yielding under internally applied pressure.

4. A pipe coupling comprising, a pipe shell of fiber-reinforced plastic material longitudinally internally tapered to fit over and be adhesively secured to a correspondingly tapered pipe end, the exterior of said pipe shell being tapered and threaded, a plurality of longitudinally extending ribs on the interior of said pipe shell adapted to directly engage with the tapered pipe end to provide between said ribs spaces to receive the adhesive by which the pipe shell may be permanently secured to the pipe end, an internal ring at the smaller end of the pipe shell to abut the end wall of the pipe with the ribs extending from said internal ring to the opposite end of the pipe sleeve, a coupling sleeve of fiber-reinforced plastic material internally tapered and threaded to screw onto the pipe shell, and a metal coupling shell embracing the plastic coupling sleeve to reinforce the same against outward radial yielding under internally applied pressure.

References Cited by the Examiner

UNITED STATES PATENTS

| | | | |
|---|---|---|---|
| 262,193 | 8/1882 | Wootten. | |
| 825,589 | 7/1906 | Dixon | 156—294 |
| 837,767 | 12/1906 | Aims | 285—423 X |
| 927,353 | 7/1909 | Jackson | 285—22 |
| 2,165,622 | 7/1939 | Donahue | 285—392 |
| 2,233,214 | 2/1941 | Lamont | 285—383 X |
| 2,424,878 | 7/1947 | Crook | 156—294 |
| 2,696,995 | 12/1954 | Schacht | 285—392 |
| 2,785,911 | 3/1957 | Kaufman | 285—260 X |
| 2,876,154 | 3/1959 | Usab. | |
| 2,998,269 | 8/1961 | Houghton | 285—423 X |
| 3,098,664 | 7/1963 | Waugh | 285—292 X |
| 3,100,658 | 8/1963 | Miller et al. | 285—230 |
| 3,143,364 | 8/1964 | Klein | 285—423 X |
| 3,212,799 | 10/1965 | Rice | 285—235 |

FOREIGN PATENTS

| | | |
|---|---|---|
| 152,083 | 6/1950 | Australia. |
| 1,123,506 | 6/1956 | France. |
| 726,507 | 3/1955 | Great Britain. |
| 47,628 | 1/1940 | Netherlands. |

CARL W. TOMLIN, *Primary Examiner.*

D. W. AROLA, *Assistant Examiner.*